US012093529B2

(12) United States Patent
Kim et al.

(10) Patent No.: US 12,093,529 B2
(45) Date of Patent: Sep. 17, 2024

(54) ELECTRONIC DEVICE AND OPERATION METHOD THEREOF

(71) Applicant: SAMSUNG ELECTRONICS CO., LTD., Suwon-si (KR)

(72) Inventors: Taesoo Kim, Suwon-si (KR); Wonsuk Jung, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/719,733

(22) Filed: Apr. 13, 2022

(65) Prior Publication Data

US 2022/0334718 A1 Oct. 20, 2022

Related U.S. Application Data

(63) Continuation of application No. PCT/KR2022/004905, filed on Apr. 6, 2022.

(30) Foreign Application Priority Data

Apr. 14, 2021 (KR) .......................... 10-2021-0048641

(51) Int. Cl.
*G06F 3/06* (2006.01)
*G06F 8/65* (2018.01)

(52) U.S. Cl.
CPC ............ *G06F 3/061* (2013.01); *G06F 3/0655* (2013.01); *G06F 3/0679* (2013.01); *G06F 8/65* (2013.01)

(58) Field of Classification Search
None
See application file for complete search history.

(56) References Cited

U.S. PATENT DOCUMENTS 8,631,399 B2   1/2014  Endo et al.
9,223,564 B2  12/2015  Munireddy et al.
(Continued)

FOREIGN PATENT DOCUMENTS

EP    2613255 A2 *  7/2013  ............... G06F 8/65
JP  2001-265468      9/2001
(Continued)

OTHER PUBLICATIONS

Search Report and Written Opinion dated Jul. 22, 2022 issued in International Patent Application No. PCT/KR2022/004905.
(Continued)

*Primary Examiner* — Michael Alsip
(74) *Attorney, Agent, or Firm* — NIXON & VANDERHYE P.C.

(57) ABSTRACT

An electronic device according to an embodiment of the disclosure may include a storage device including a memory and a memory controller that controls the memory, and a processor operatively coupled to the storage device, wherein the processor may be configured to: identify a version of firmware for driving the memory controller, stop providing an input/output request to the storage device based on the identified firmware version, transmit updated firmware to the storage device based on the storage device completing an input/output operation corresponding to an input/output request waiting to be processed within a specified time, and reset the storage device to allow the memory controller to execute the updated firmware based on completion of installation of the updated firmware in the storage device.

12 Claims, 6 Drawing Sheets

(56) References Cited

U.S. PATENT DOCUMENTS

| | | |
|---|---|---|
| 9,594,910 B2 | 3/2017 | Sarangdhar et al. |
| 9,930,051 B1 * | 3/2018 | Potlapally ............. H04L 63/126 |
| 10,402,565 B2 | 9/2019 | Sarangdhar et al. |
| 10,990,281 B2 | 4/2021 | Yu et al. |
| 11,048,495 B2 | 6/2021 | Kim et al. |
| 11,226,811 B2 | 1/2022 | Lappi et al. |
| 2013/0198730 A1 * | 8/2013 | Munireddy ............. G06F 8/654 |
| | | 717/170 |
| 2019/0087173 A1 | 3/2019 | Lappi et al. |
| 2019/0179554 A1 | 6/2019 | Pioch et al. |
| 2019/0243637 A1 | 8/2019 | Nachimuthu et al. |
| 2020/0218527 A1 * | 7/2020 | Ganesan ................... G06F 8/65 |
| 2020/0326925 A1 | 10/2020 | Nachimuthu et al. |
| 2021/0011706 A1 | 1/2021 | Nachimuthu et al. |

FOREIGN PATENT DOCUMENTS

| | | |
|---|---|---|
| KR | 10-1710328 | 2/2017 |
| KR | 10-2019-0073101 | 6/2019 |
| KR | 10-2019-0101171 | 8/2019 |

OTHER PUBLICATIONS

Extended European Search Report for EP Application No. 22788327.9 dated Jun. 25, 2024, 8 pages.

\* cited by examiner

ELECTRONIC DEVICE AND OPERATION METHOD THEREOF

CROSS-REFERENCE TO RELATED APPLICATIONS

This application is a continuation of International Application No. PCT/KR2022/004905 designating the United States, filed on Apr. 6, 2022, in the Korean Intellectual Property Receiving Office and claiming priority to Korean Patent Application No. 10-2021-0048641, filed on Apr. 14, 2021, in the Korean Intellectual Property Office, the disclosures of which are incorporated by reference herein in their entireties.

BACKGROUND

Field

The disclosure relates to an electronic device and an operation method of the electronic device.

Description of Related Art

An electronic device may include a storage device (or a memory device) for reading and writing data. The storage device may include a memory for storing data and a memory controller for controlling the memory. The memory controller of the storage device may be driven through firmware for efficiently performing various operations of the memory device.

The firmware of the memory controller may be updated periodically or aperiodically. Because the electronic device is restarted (or rebooted) while the firmware of the memory controller is updated, it may take a long time to update the firmware.

SUMMARY

Embodiments of the disclosure provide an electronic device capable of updating firmware of a memory controller without restarting the electronic device.

According to an embodiment of the disclosure, an electronic device may include: a storage device including a memory and a memory controller configured to control the memory, and a processor operatively coupled to the storage device, wherein the processor may be configured to: identify a version of firmware for driving the memory controller, stop providing an input/output request to the storage device based on the identified firmware version, transmit updated firmware to the storage device based on the storage device completing an input/output operation corresponding to an input/output request waiting to be processed within a specified time, and reset the storage device to allow the memory controller to execute the updated firmware based on completion of installation of the updated firmware in the storage device.

According to another embodiment of the disclosure, a method of operating an electronic device may include: identifying a version of firmware for driving a memory controller of a storage device included in the electronic device, stopping providing an input/output request to the storage device based on the identified firmware version, transmitting updated firmware to the storage device based on the storage device completing an input/output operation corresponding to an input/output request waiting to be processed within a specified time, and resetting the storage device to allow the memory controller to execute the updated firmware based on completion of installation of the updated firmware in the storage device.

According to various embodiments of the disclosure, it is possible to provide an electronic device capable of updating the firmware of the memory controller without restarting the electronic device.

In addition, various effects that are directly or indirectly understood through the disclosure may be provided.

BRIEF DESCRIPTION OF THE DRAWINGS

The above and other aspects, features and advantages of certain embodiments of the present disclosure will be more apparent from the following detailed description, taken in conjunction with the accompanying drawings, in which.

With regard to description of drawings, the same or similar elements may be marked by the same or similar reference numerals.

DETAILED DESCRIPTION

Figure 1:
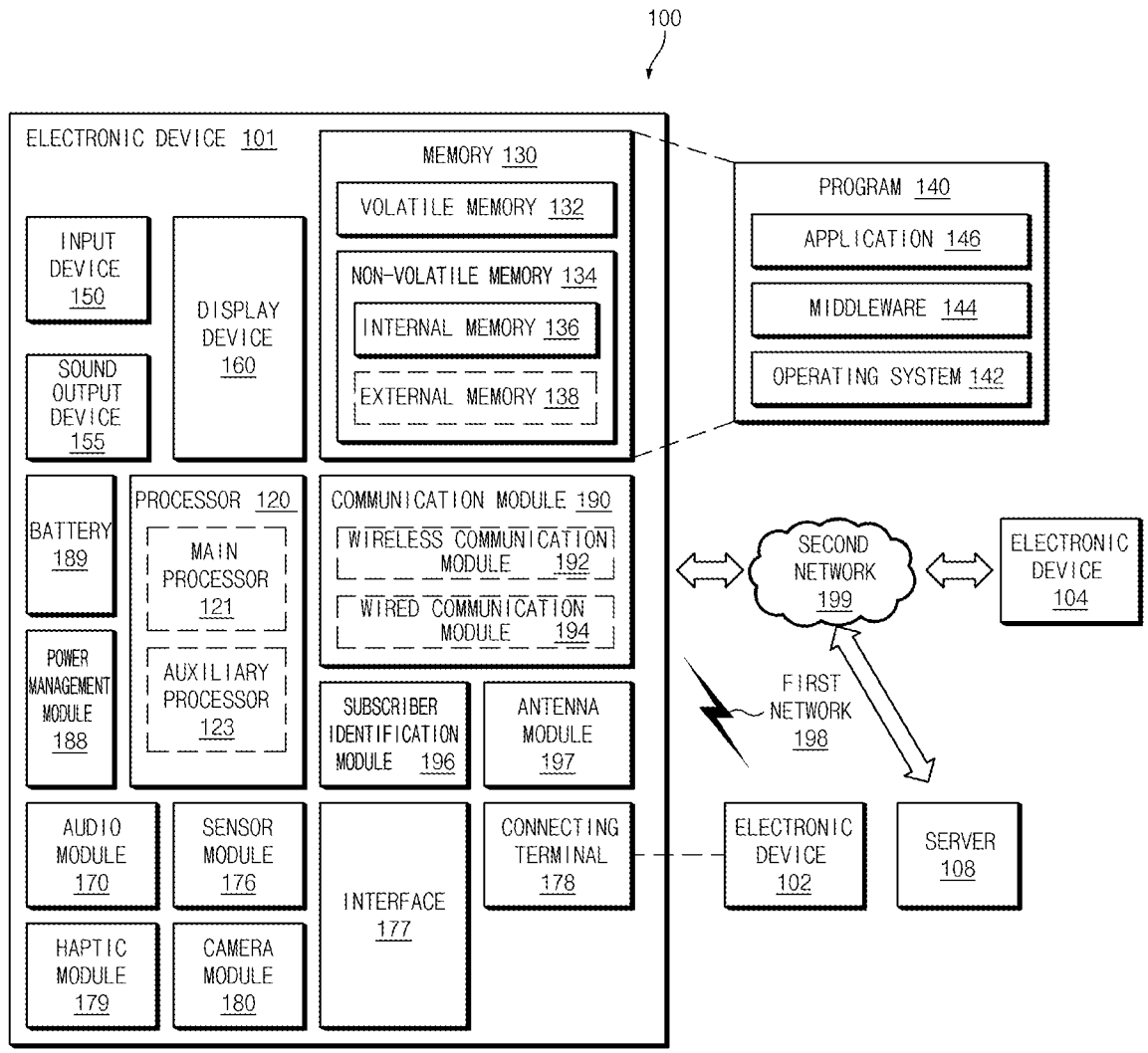
FIG. 1 is a block diagram illustrating an example electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
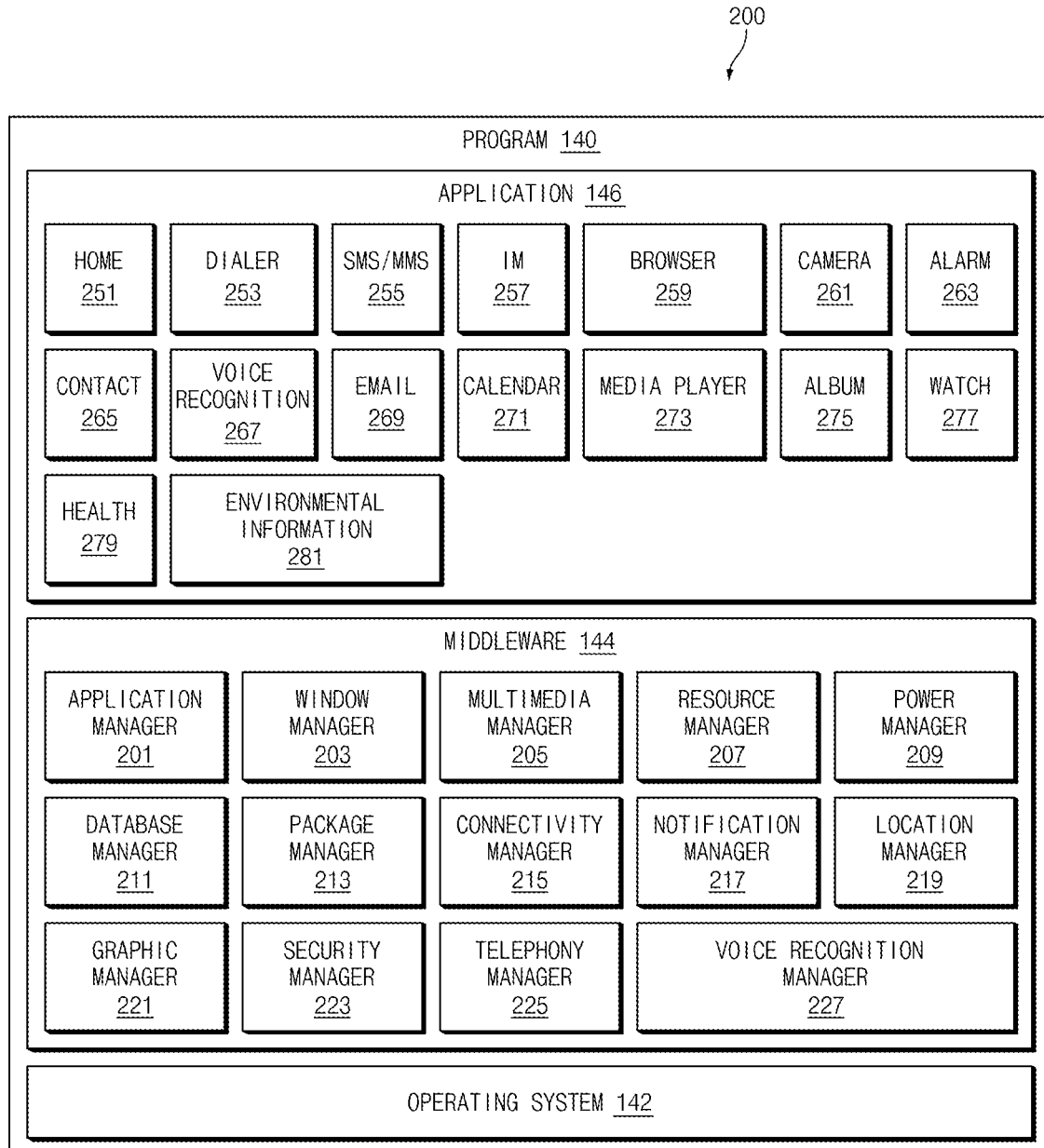
FIG. 2 is a block diagram illustrating an example configuration of the program according to various embodiments.

FIG. 2 is a block diagram 200 illustrating the program 140 according to various embodiments. According to an embodiment, the program 140 may include an operating system (OS) 142 to control one or more resources of the electronic device 101, middleware 144, or an application 146 executable in the OS 142. The OS 142 may include, for example, Android™, iOS™, Windows™, Symbian™, Tizen™, or Bada™. At least part of the program 140, for example, may be pre-loaded on the electronic device 101 during manufacture, or may be downloaded from or updated by an external electronic device (e.g., the electronic device 102 or 104, or the server 108) during use by a user.

The OS 142 may control management (e.g., allocating or deallocation) of one or more system resources (e.g., process, memory, or power source) of the electronic device 101. The OS 142, additionally or alternatively, may include one or more driver programs to drive other hardware devices of the electronic device 101, for example, the input module 150, the sound output module 155, the display module 160, the audio module 170, the sensor module 176, the interface 177, the haptic module 179, the camera module 180, the power management module 188, the battery 189, the communication module 190, the subscriber identification module 196, or the antenna module 197.

The middleware 144 may provide various functions to the application 146 such that a function or information provided from one or more resources of the electronic device 101 may be used by the application 146. The middleware 144 may include, for example, an application manager 201, a window manager 203, a multimedia manager 205, a resource manager 207, a power manager 209, a database manager 211, a package manager 213, a connectivity manager 215, a notification manager 217, a location manager 219, a graphic manager 221, a security manager 223, a telephony manager 225, or a voice recognition manager 227.

The application manager 201, for example, may manage the life cycle of the application 146. The window manager 203, for example, may manage one or more graphical user interface (GUI) resources that are used on a screen. The multimedia manager 205, for example, may identify one or more formats to be used to play media files, and may encode or decode a corresponding one of the media files using a codec appropriate for a corresponding format selected from the one or more formats. The resource manager 207, for example, may manage the source code of the application 146 or a memory space of the memory 130. The power manager 209, for example, may manage the capacity, temperature, or power of the battery 189, and determine or provide related information to be used for the operation of the electronic device 101 based at least in part on corresponding information of the capacity, temperature, or power of the battery 189. According to an embodiment, the power manager 209 may interwork with a basic input/output system (BIOS) (not shown) of the electronic device 101.

The database manager 211, for example, may generate, search, or change a database to be used by the application 146. The package manager 213, for example, may manage installation or update of an application that is distributed in the form of a package file. The connectivity manager 215, for example, may manage a wireless connection or a direct connection between the electronic device 101 and the external electronic device. The notification manager 217, for example, may provide a function to notify a user of an occurrence of a specified event (e.g., an incoming call, message, or alert). The location manager 219, for example, may manage locational information on the electronic device 101. The graphic manager 221, for example, may manage one or more graphic effects to be offered to a user or a user interface related to the one or more graphic effects.

The security manager 223, for example, may provide system security or user authentication. The telephony manager 225, for example, may manage a voice call function or a video call function provided by the electronic device 101. The voice recognition manager 227, for example, may transmit a user's voice data to the server 108, and receive, from the server 108, a command corresponding to a function to be executed on the electronic device 101 based at least in part on the voice data, or text data converted based at least in part on the voice data. According to an embodiment, the middleware 244 may dynamically delete some existing components or add new components. According to an embodiment, at least part of the middleware 144 may be included as part of the OS 142 or may be implemented as another software separate from the OS 142.

The application 146 may include, for example, a home 251, dialer 253, short message service (SMS)/multimedia messaging service (MMS) 255, instant message (IM) 257, browser 259, camera 261, alarm 263, contact 265, voice recognition 267, email 269, calendar 271, media player 273, album 275, watch 277, health 279 (e.g., for measuring the degree of workout or biometric information, such as blood sugar), or environmental information 281 (e.g., for measuring air pressure, humidity, or temperature information) application. According to an embodiment, the application 146 may further include an information exchanging application (not shown) that is capable of supporting information exchange between the electronic device 101 and the external electronic device. The information exchange application, for example, may include a notification relay application adapted to transfer designated information (e.g., a call, message, or alert) to the external electronic device or a device management application adapted to manage the external electronic device. The notification relay application may transfer notification information corresponding to an occurrence of a specified event (e.g., receipt of an email) at another application (e.g., the email application 269) of the electronic device 101 to the external electronic device. Additionally or alternatively, the notification relay application may receive notification information from the external electronic device and provide the notification information to a user of the electronic device 101.

The device management application may control the power (e.g., turn-on or turn-off) or the function (e.g., adjustment of brightness, resolution, or focus) of the external electronic device or some component thereof (e.g., a display module or a camera module of the external electronic device). The device management application, additionally or alternatively, may support installation, delete, or update of an application running on the external electronic device.

Figure 3:
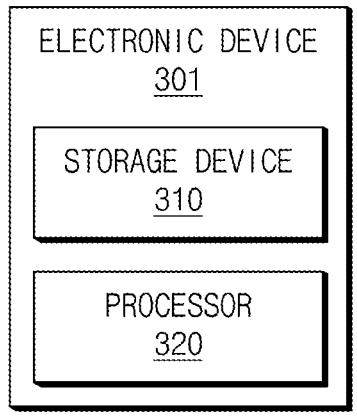
FIG. 3 is a block diagram illustrating an example configuration of an electronic device according to various embodiments.

FIG. 3 is a block diagram illustrating an example configuration of an electronic device according to various embodiments.

According to an embodiment, an electronic device 301 (e.g., the electronic device 101 of FIG. 1) may include a storage device 310 (e.g., the memory 130 of FIG. 1) and a processor (e.g., including processing circuitry) 320 (e.g., the processor 120 of FIG. 1).

According to an embodiment, the storage device 310 may store various data (or information). According to an embodiment, the storage device 310 may store at least one program, application, data, or instructions executed by the processor 320. According to an embodiment, the storage device 310 may include at least a part of the memory 130 illustrated in FIG. 1. According to an embodiment, the storage device 310 may store information or instructions for performing at least a part of an operation of the electronic device 301 to be described in greater detail below. According to an embodiment, the storage device 310 may store instructions related to a plurality of applications executed by the processor 330. According to an embodiment, the storage device 310 may store information necessary for an operation of the electronic device 301 and/or information related to a user.

According to an embodiment, the storage device 310 may correspond to various types of storage devices according to an interface communicating with the processor 320. According to an embodiment, the storage device 310 may correspond, for example, and without limitation, to at least one of a solid state drive (SSD), a multimedia card including at least one of, a multimedia card (MMC), an embedded multimedia card (eMMC), a micro-MMC, a secure digital (SD) card including at least one of secure digital or mini-SD or micro-SD, a storage device including at least one of a universal storage bus (USB) storage device, universal flash storage (UFS) device, a personal computer memory card international association (PCMCIA), a storage device including at least one of a peripheral component interconnection (PCI) or a PCI express (PCI-E) card, various types of storage devices such as a compact flash (CF) card, a smart media card, a memory stick, or the like. In various embodiments, the storage device 310 will be described as a UFS device as an example.

According to an embodiment, the storage device 310 may store data in response to a write request of the processor 320 or provide the stored data to the processor 320 in response to a read request of the processor 320. For example, the processor 320 communicating with the storage device 310 may be referred to as a host.

According to an embodiment, the storage device 310 may include a memory controller and a memory. According to an embodiment, the memory controller of the storage device 310 may receive a request (a write request or a read request) from the processor 320, and may allow the memory of the storage device 310 to operate in response to the received request. For example, the memory controller may provide a write command to the memory in response to a write request from the processor 320. As another example, the memory controller may provide a read command to the memory in response to a read request from the processor 320. The memory may store data or read the stored data according to the received command and provide the data to the memory controller and/or the processor 320. According to various embodiments, the memory controller of the storage device 310 may control an overall operation of the storage device 310 (e.g., an operation of managing the memory of the storage device 310).

According to an embodiment, the memory controller of the storage device 310 may operate (or be driven) by execution of firmware that implements the operation of the memory controller. The memory controller of the storage device 310 may perform various operations of the storage device 310 using firmware. In various embodiments, the firmware that drives the memory controller of the storage device 310 may be periodically or aperiodically updated. The memory controller of the storage device 310 may receive updated firmware from the processor 320. The memory controller of the storage device 310 may install the updated firmware received from the processor 320.

According to an embodiment, the memory of the storage device 310 may include a non-volatile memory. For example, the memory of the storage device 310 may include a NAND flash memory. For example, the memory of the storage device 310 may operate under the control of the memory controller.

According to an embodiment, the processor 320 may be operatively connected to other components of the electronic device 301, include various processing circuitry and control various operations of the electronic device 301. For example, the processor 320 may include an application processor of the electronic device 301. The processor 320 may perform various operations of the electronic device 301 by executing one or more instructions stored in the storage device 310. Hereinafter, the operations described as being performed by the electronic device 301 may be referred to as being performed by the processor 320.

According to an embodiment, the processor 320 may store data in the storage device 310 or may read data stored in the storage device 310. According to an embodiment, the processor 320 may transmit at least one input/output request for storing or reading data to the storage device 310. According to an embodiment, a transmission speed of an input/output request transmitted by the processor 320 to the storage device 310 may be faster than a processing speed of an input/output request processed by the storage device 310. The storage device 310 may store the input/output request received from the processor 320 in an input/output queue, and may perform an input/output operation corresponding to the input/output request stored in the input/output queue. According to an embodiment, an input/output request that is waiting for processing by the storage device 310 may be referred to as a pending input/output request.

According to an embodiment, the processor 320 may provide an address to store data, a write request, and data to be stored in the storage device 310 to the memory controller of the storage device 310. The memory controller of the storage device 310 may store data in the memory of the storage device 310 in response to the received write request. According to an embodiment, the processor 320 may provide an address in which data is stored and a read request to the memory controller of the storage device 310. The memory controller of the storage device 310 may provide data stored in an area of the memory of the storage device 310 corresponding to the received address to the processor 320 in response to the received read request.

According to an embodiment, the processor 320 may update firmware that drives the memory controller of the storage device 310. According to an embodiment, the processor 320 may identify a version of firmware that drives the memory controller of the storage device 310. For example, the processor 320 may identify the current version of the firmware of the memory controller being executed (or activated). The processor 320 may determine whether the identified version of firmware is a version that needs to be updated. For example, the processor 320 may recognize that there is no need to update the firmware when the identified firmware version is the latest version. In another example, when the identified firmware version is not the latest version, the processor 320 may recognize that the firmware needs to be updated. Hereinafter, the operation of the processor 320 and the operation of the storage device 310 will be mainly described when the identified firmware version is not the latest version.

According to an embodiment, when the processor 320 recognizes that the firmware of the memory controller needs to be updated (e.g., when the version of the firmware of the memory controller is not the latest version), the processor 320 may stop providing an input/output request. For example, the processor 320 may be set in a host busy status to prevent an additional input/output request from being provided to the storage device 310. For example, the processor 320 which is set in the host busy status may be restricted from providing an input/output request to the storage device 310. According to an embodiment, the processor 320 may wait for a specified time (e.g., 5 seconds). According to an embodiment, after the processor 320 is set in the host busy status, the processor 320 may wait for the storage device 310 to process the pending input/output request for a specified time period. According to an embodiment, the processor 320 may set a state of the electronic device 301 such that the electronic device 301 does not enter an inactive state (e.g., a suspend state) while waiting in standby (e.g., for a specified time).

According to an embodiment, the processor 320 may update the firmware of the memory controller based on receiving a notification indicating that the operation corresponding to the pending input/output request is completed within a specified time. For example, the storage device 310 may notify the processing completion of the pending input/output request to the processor 320 after the processing of the pending input/output request is completed within a specified time. According to an embodiment, the processor 320 may transmit the updated firmware along with the write request to the storage device 310. The processor 320 may store the updated firmware in a buffer of the storage device 310. For example, the buffer of the storage device 310 may correspond to storage in which data transmitted/received between the storage device 310 and the processor 320 are temporarily stored. According to an embodiment, the processor 320 may store the updated firmware in the buffer of the storage device 310 such that the memory controller installs the updated firmware stored in the buffer. In another example, when the operation corresponding to the pending input/output request is not completed within the specified time, the processor 320 may release the host busy status. For example, the processor 320 may resume providing the input/output request that was stopped to the storage device 310.

According to an embodiment, the processor 320 may reset the storage device 310 after the updated firmware is installed in the storage device 310 (or the memory controller of the storage device 310). According to an embodiment, when the storage device 310 is reset, the updated firmware may be activated. The memory controller of the storage device 310 thus reset may be driven using the updated firmware.

According to an embodiment, the processor 320 may reset the storage device 310 without restarting (or rebooting) the electronic device 301, thereby activating the updated firmware of the memory controller. For example, the restart of the electronic device 301 may include a series of operations of turning on the power supply of the electronic device 301 after turning off (or stopping) the power supply of the electronic device 301. According to an embodiment, the processor 320 may reset the storage device 310 while power is continuously supplied to the electronic device 301, thereby activating the updated firmware of the memory controller.

According to an embodiment, the processor 320 may activate the updated firmware of the memory controller by resetting the storage device 310 while power is continuously supplied to the electronic device 301. For example, the processor 320 may reset the storage device 310 in a state where power is continuously supplied to the electronic device 301 without restarting the electronic device 301 by re-supplying power after the power of the electronic device 301 is cut off (e.g., shut down), thereby activating the updated firmware of the memory controller.

According to an embodiment, the processor 320 may determine whether the firmware of the memory controller is successfully updated using a specified instruction (or command, e.g., bdeviceFFUStatus). According to an embodiment, the processor 320 may recognize that the firmware of the memory controller is successfully updated using information included in a return value obtained based on a specified instruction. According to an embodiment, the processor 320 may release the host busy status of the processor 320 after the firmware of the memory controller is successfully updated. For example, after the firmware of the memory controller is successfully updated, the processor 320 may resume providing the stopped input/output request to the storage device. According to an embodiment, the processor 320 of which the host busy state is released may be in a state (e.g., a normal state) capable of transmitting an input/output request to the storage device 310. The processor 320 of which the host busy status is released may provide the input/output request to the storage device 310.

In various embodiments, the processor 320 and the storage device 310 may update the firmware of the memory controller of the storage device 310 using an instruction (or command) that corresponds to the above-described operations. In an embodiment, according to the instruction, when the current version of the firmware for driving the memory controller is identified and there is a need to update the firmware (e.g., when the current firmware of the memory controller is not the latest version), it is possible to apply the updated firmware to the memory controller without restarting the electronic device 301.

In an embodiment, according to the instruction, the processor 320 may recognize that the firmware of the memory controller needs to be updated. In an embodiment, according to the instruction, the processor 320 is in a restricted state (e.g., host busy status) not to transmit an additional input/output request to the storage device 310 (or the memory controller of the storage device 310). For example, according to the instruction, the processor 320 may stop transmitting the additional input/output request to the storage device 310. In an embodiment, according to the instruction, the processor 320 may wait for a specified time such that the processing of the input/output request (e.g., pending input/output request) waiting to be processed is completed. In an embodiment, according to the instruction, the processor 320 may transmit the updated firmware along with the write request to the storage device 310 based on the fact that the pending input/output request is completed within a specified time. In an embodiment, according to the instruction, the processor 320 may store the updated firmware in a buffer of the storage device 310 to allow the memory controller to install the updated firmware stored in the buffer. In an embodiment, according to the instruction, the processor 320 may reset the storage device 310 after the updated firmware is installed in the storage device 310 (or the memory controller of the storage device 310). The storage device 310 thus reset may activate the updated firmware. According to an embodiment, the storage device 310 thus reset may drive the memory controller of the storage device 310 using the updated firmware. In an embodiment, according to the instruction, when the version of the firmware of the memory controller is identified and the version of the firmware of the memory controller is the latest version, the processor 320 may change (or switch) the state thereof to a state (e.g., a normal state) in which the additional input/output request can be transmitted to the storage device 310 (or the memory controller of the storage device 310). For example, the processor 320 may resume transmitting the interrupted additional input/output request to the storage device 310.

According to an embodiment, when updating the firmware of the memory controller included in the storage device 310, the processor 320 may reset the storage device 310 without restarting the electronic device 301, thereby completing the firmware update. When the electronic device 301 is restarted, a longer time (e.g., 20 seconds to 30 seconds) may be taken than a time (e.g., 2 seconds to 5 seconds) taken to reset the storage device 310. According to an embodiment, the electronic device 301 may reset the storage device 310 such that the update of the firmware of the memory controller is completed within a short time, thereby improving efficiency.

Figure 4:
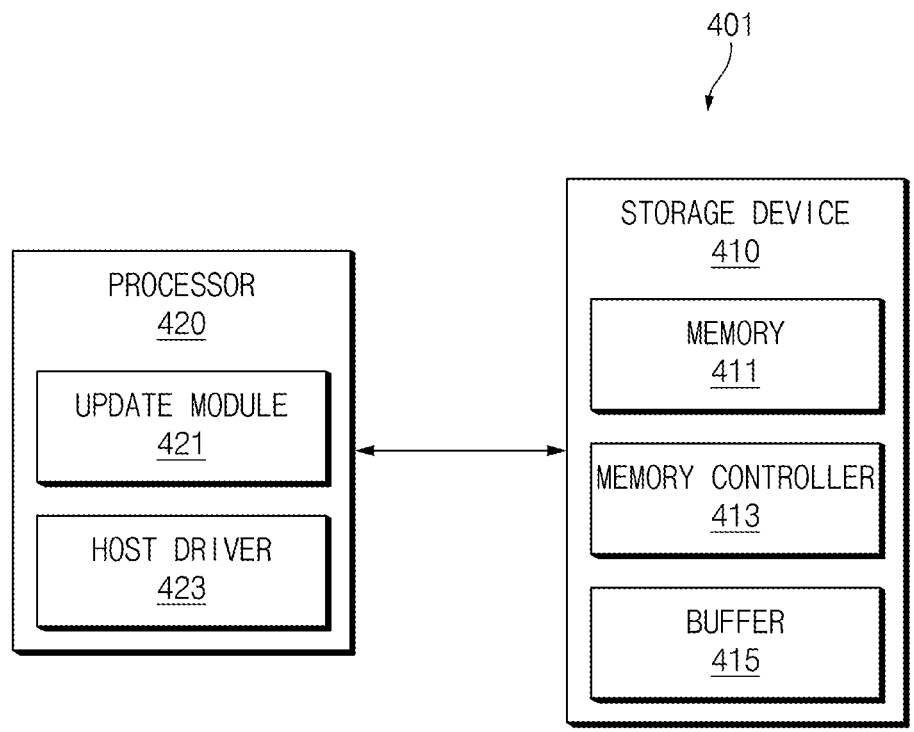
FIG. 4 is a block diagram illustrating an example configuration of an electronic device according to various embodiments.

FIG. 4 is a block diagram illustrating an example configuration of an electronic device according to various embodiments.

According to an embodiment, an electronic device 401 (e.g., the electronic device 101 of FIG. 1 or the electronic device 301 of FIG. 3) may include a storage device 410 (e.g., the memory 130 of FIG. 1 or the storage device 310 of FIG. 3) and a processor (e.g., including processing circuitry) 420 (e.g., the processor 120 of FIG. 1 or the processor 320 of FIG. 3).

According to an embodiment, the storage device 410 may include a memory 411, a memory controller 413, and a buffer 415. According to an embodiment, the components of the storage device 410 may be implemented using physical hardware modules, logic, logic blocks, or circuits. According to an embodiment, the memory 411 may include a non-volatile memory. For example, the memory 411 may include a NAND flash memory. According to an embodiment, the buffer 415 may include a volatile memory. For example, the buffer 415 may include at least one of dynamic random access memory (DRAM) and static random access memory (SRAM). For example, the storage device 410 may correspond to a UFS device.

According to an embodiment, the memory 411 may include a plurality of memory cells capable of storing data. For example, the memory cells may include a single level cell (SLC), a multi-level cell (MLC) storing two data bits, a triple level cell (TLC) storing three data bits, or a quad level cell (QLC) capable of storing four data bits, but are not limited to the above-described example.

According to an embodiment, the memory 411 may process (e.g., store, read, and/or erase) data under control of the memory controller 413. According to an embodiment, the memory 411 may receive a command and an address from the memory controller 413. According to an embodiment, the memory 411 may be configured to access an area selected by the received address. Accessing the selected area may refer, for example, to the memory 411 performing an operation corresponding to the received command on the selected area. For example, the memory 411 may perform a write (or storing) operation, a read operation, and an erase operation on one selected area. In the write operation, the memory 411 may store data in an area selected by an address. In the read operation, the memory 411 may read data from an area selected by an address. In the erase operation, the memory 411 may erase data stored in an area selected by an address.

According to an embodiment, the memory controller 413 may control the overall operation of the storage device 410. According to an embodiment, when power is applied to the storage device 410, the memory controller 413 may execute firmware. For example, the firmware of the memory controller 413 may be stored in the memory 411. When power is applied to the storage device 410, the memory controller 413 may load and execute the firmware stored in the memory 411. According to an embodiment, the firmware may include a host interface layer that receives a request (e.g., an input/output request) from the processor 420 (or a host) or outputs a response to the request to the processor 420, a flash translation layer that manages operations between an interface of the processor 420 and an interface of the memory 411, and a flash interface layer that provides a command (e.g., a write command or a read command) to the memory 411 or receives a response from the memory 411.

In an embodiment, the memory controller 413 may receive data and a logical address from the processor 420. The memory controller 413 may convert the received logical address into a physical address indicating addresses of memory cells in which received data are to be stored among memory cells included in the memory 411. The memory controller 413 may provide the memory 411 with a command corresponding to a request received from the processor 420 and a physical address obtained by converting a logical address. The memory 411 may perform an operation corresponding to a command on memory cells corresponding to a physical address. For example, the memory 411 may receive a write command, a designated physical address, and data from the memory controller 413. The memory 411 may store received data in memory cells corresponding to a physical address designated in response to a write command. In various embodiments, the memory controller 413 may perform a write operation, a read operation, and/or an erase operation (e.g., wear leveling, or garbage collection) on its own regardless of a request from the processor 420.

According to an embodiment, the memory controller 413 may receive the updated firmware from the processor 420. The memory controller 413 may perform an operation of updating the firmware using the received updated firmware.

According to an embodiment, the buffer 415 may temporarily store the data received from the processor 420. For example, the buffer 415 may receive the updated firmware to be installed in the memory controller 413 from the processor 420 and store the updated firmware in one area of the buffer 415.

According to an embodiment, the processor 420 may include an update module (e.g., including various processing circuitry and/or executable program instructions) 421 and a host driver (e.g., including various processing circuitry and/or executable program instructions) 423. According to an embodiment, the components of the processor 420 may be software modules corresponding to one or more instructions stored in the storage device 410. For example, a software module may be executed by the processor 420. According to an embodiment, at least one of the components of the processor 420 may be implemented using a physical hardware module, logic, logic block, or circuit. According to an embodiment, the update module 421 may control an update operation of firmware that drives the memory controller 413. For example, the update module 421 may correspond to a field firmware update (FFU) module. According to an embodiment, the host driver 423 may control at least a part of an operation of the storage device 410.

According to an embodiment, the update module 421 may identify the current version of the firmware of the memory controller 413. According to an embodiment, the update module 421 may determine whether the identified version of the firmware is a version that needs to be updated. For example, when the identified version of the firmware is the latest version, the update module 421 may recognize that the firmware update is not required. In another example, when the identified firmware version is not the latest version, the update module 421 may recognize that firmware update is required. The update module 421 may transmit a first notification to the host driver 423 when recognizing that firmware update is necessary. For example, the first notification may include information indicating that the firmware of the memory controller 413 is required to be updated (or information indicating that the firmware is not the latest).

According to an embodiment, the host driver 423 may stop providing an input/output request to the storage device 410 based on the reception of the first notification. According to an embodiment, the host driver 423 may set the processor 420 (or the host driver 423) into a host busy status so as not to transmit an additional input/output request to the storage device 410 based on the reception of the first notification. For example, the processor 420 which is set in the host busy status may be restricted from additionally providing an input/output request to the storage device 410.

According to an embodiment, the host driver 423 may wait for completion of the previously transmitted I/O request waiting to be processed. For example, an input/output request waiting to be processed may be stored in an input/output queue corresponding to one area of the buffer 415 and may be in a waiting state for processing. The memory controller 413 may perform an operation corresponding to an input/output request stored in the input/output queue and waiting for processing. For example, an input/output request waiting to be processed may be referred to as a pending input/output request.

According to an embodiment, the host driver 423 may wait for a specified time (e.g., 5 seconds) until the execution of the operation corresponding to the pending input/output request is completed. According to an embodiment, the host driver 423 may cause the processor 420 to remain in an activated state without being deactivated for a specified waiting time. For example, the host driver 423 may be configured to cause the processor 420 not to enter a suspend state for a specified waiting time.

According to an embodiment, the host driver 423 may transmit a second notification to the update module 421 when the storage device 410 completes performing an operation corresponding to the pending input/output request within a specified time. For example, the second notification may include information indicating that the storage device 410 completes an operation corresponding to the pending input/output request within a specified time. For example, the second notification may include information indicating that an operation corresponding to the pending input/output request is completed within a specified time and thus preparation for updating the firmware is completed. In another example, when the storage device 410 does not complete the operation corresponding to the pending input/output request within a specified time, the host driver 423 may release the host busy status. For example, the host driver 423 may resume providing an input/output request that has been stopped to the storage device.

According to an embodiment, the host driver 423 may provide the updated firmware for driving the memory controller 413 to the storage device 410. For example, the host driver 423 may provide a write request (or buffer write request) to store data in the buffer 415 and the updated firmware to the storage device 410. According to an embodiment, the host driver 423 may wait for a specified time for the memory controller 413 to update the firmware using the updated firmware stored in the buffer 415. According to an embodiment, the memory controller 413 may update the firmware using the updated firmware. Based on the completion of the firmware update by the memory controller 413, the update module 421 may transmit a third notification to the host driver 423. For example, the third notification may include information indicating that the installation of the updated firmware in the memory controller 413 is completed.

According to an embodiment, the host driver 423 (or the processor 420) may reset the storage device 410 based on the third notification. According to an embodiment, when the storage device 410 is reset, the updated firmware may be activated. The memory controller 413 of the reset storage device 410 may be driven using the updated firmware. According to an embodiment, the host driver 423 may reset the storage device 410 without restarting (or rebooting) the electronic device 401, thereby activating the updated firmware for driving the memory controller 413. According to an embodiment, the host driver 423 may activate the updated firmware of the memory controller 413 by resetting the storage device 410 while power is continuously supplied to the electronic device 401. For example, the host driver 423 may reset the storage device 410 while power is continuously supplied to the electronic device 401 without restarting (or rebooting) the electronic device 401 in which power is supplied again after the power of the electronic device 401 is cut off (e.g., shut down), thereby driving the memory controller 413 with the updated firmware.

According to an embodiment, the host driver 423 may determine whether the firmware of the memory controller 413 is successfully updated using a specified instruction (or command, e.g., bdeviceFFUStatus). According to an embodiment, the host driver 423 may recognize that the firmware of the memory controller 413 is successfully updated using information included in a return value obtained based on a specified instruction. According to an embodiment, the host driver 423 may release the host busy status of the processor 420 (or the host driver 423) after the firmware of the memory controller 413 is successfully updated. According to an embodiment, the processor 420 (or the host driver 423) of which the host busy status is released may be in a state (e.g., a normal state) capable of transmitting an input/output request to the storage device 410. After the host busy status is released, the host driver 423 may provide an additional input/output request to the storage device 410. For example, the host driver 423 may resume providing an input/output request that has been stopped to the storage device.

In various embodiments, the storage device 410 and the processor 420 may update the firmware for driving the memory controller 413 of the storage device 410 using an instruction (or command) corresponding to the above-described operations. Table 1 illustrates, by way of non-limiting example, the instruction for updating the firmware of the memory controller 413. For example, the instruction may use a command format of the JEDEC standard. For example, the instruction may be implemented in a flag scheme.

TABLE 1

| IDN | Name | Type | Type # ind # Sel | default | Description |
|---|---|---|---|---|---|
| xxh | fFFUinstall | Read/Volatile | D | 0 | Install a firmware 0b: FFU install is not started 1b: start installation of FFU |

In an embodiment, according to the instruction, when the current version of the firmware for driving the memory controller 413 is identified and there is a need to update the firmware (e.g., when the current firmware of the memory controller 413 is not the latest version), the processor 420 may apply the updated firmware to the memory controller 413 without restarting the electronic device 401.

In an embodiment, according to the instruction, the update module 421 may recognize that the firmware of the memory controller 413 needs to be updated. In an embodiment, according to the instruction, the update module 421 may transmit the first notification to the host driver 423 when the firmware of the memory controller 413 needs to be updated (e.g., when the identified current firmware version is not the latest version). For example, the first notification may include information indicating that the firmware of the memory controller 413 needs to be updated.

In an embodiment, according to the instruction, the host driver 423 may stop providing an additional input/output request to the storage device 410 (or the memory controller 413 of the storage device 410) based on the first notification. For example, according to the instruction, based on the first notification, the host driver 423 may set a state of the processor 420 (or the host driver 423) to a limited state (e.g., host busy status) in which any additional input/output requests are prevented from being transmitted to the storage device 410 (or the memory controller 413).

In an embodiment, according to the instruction, the host driver 423 may wait for a specified time such that the processing of the pending input/output request (e.g., pending input/output request) is completed. The host driver 423 may cause the processor 420 to maintain an active state without entering an inactive state (e.g., a suspend state) for a waiting specified time.

In an embodiment, according to the instruction, the host driver 423 may transmit a second notification to the update module 421 based on whether the input/output request waiting for processing is completed within a specified time. For example, the second notification may include information indicating that an operation corresponding to the pending input/output request is completed within a specified time and thus preparation for updating the firmware is completed.

In an embodiment, according to the instruction, the host driver 423 may transmit the updated firmware to the storage device 410 together with a write request. For example, according to the instruction, the host driver 423 may transmit the updated firmware and a write request (e.g., a buffer write request) to store the updated firmware in the buffer 415 of the storage device 410 to the storage device 410 (e.g., the memory controller 413).

In an embodiment, according to the instruction, the memory controller 413 may store the updated firmware in the buffer 415 in response to the received write request. In an embodiment, according to the instruction, the memory controller 413 may update the firmware using the updated firmware stored in the buffer 415. For example, the memory controller 413 may install the updated firmware stored in the buffer 415.

In an embodiment, according to the instruction, the update module 421 may transmit a third notification to the host driver 423 after the updated firmware is installed. For example, the third notification may include information indicating that the installation of the updated firmware in the memory controller 413 is completed. In an embodiment, according to the instruction, the host driver 423 (or the processor 420) may reset the storage device 410 based on the third notification. According to an embodiment, when the storage device 410 is reset, the updated firmware may be activated. For example, the storage device 410 thus reset may activate the updated firmware. According to an embodiment, the storage device 410 thus reset may drive the memory controller 413 of the storage device 410 using the updated firmware.

In an embodiment, according to the instruction, when the version of the firmware of the memory controller 413 is identified and the version of the firmware of the memory controller 413 is the latest version, the host driver 423 may change (or switch) the state of the processor 420 to a state (e.g., a normal state) in which the additional input/output request can be transmitted to the storage device 410 (or the memory controller 413 of the storage device 410). For example, according to the instruction, the host driver 423 may determine whether the firmware is successfully updated using a specified instruction (e.g., bdeviceFFUStatus). For example, according to the instruction, the host driver 423 may release a limited state (e.g., a host busy status) of the processor 420 (or the host driver 423) based on the successful firmware update. For example, the processor 420 (or the host driver 423) of which the limited state is released may be in a state (e.g., a normal state) in which an input/output request can be transmitted to the storage device 410. After the limited state is released, the host driver 423 may provide an additional input/output request to the storage device 410. For example, the host driver 423 may resume providing the input/output request that was stopped to the storage device 410.

According to an embodiment, when the firmware of the memory controller 413 included in the storage device 410 is updated, the processor 420 may reset the storage device 410 without restarting the electronic device 401, thereby completing the firmware update. According to an embodiment, the electronic device 401 may reset the storage device 410 to update the firmware without restarting the electronic device 401, so that it is possible to have improved efficiency of updating firmware within a short time.

An electronic device (e.g., the electronic device 101 of FIG. 1, the electronic device 301 of FIG. 3, or the electronic device 401 of FIG. 4) according to an example embodiment of the disclosure may include: a storage device (e.g., the memory 130 of FIG. 1, the storage device 310 of FIG. 3, or the storage device 410 of FIG. 4) including a memory (e.g., the memory 411 of FIG. 4) and a memory controller (e.g., the memory controller 413 of FIG. 4) configured to control the memory, and a processor (e.g., the processor 120 of FIG. 1, the processor 320 of FIG. 3, or the processor 420 of FIG. 4). According to an embodiment, the processor may be configured to: identify a version of firmware for driving the memory controller, stop providing an input/output request to the storage device based on the identified firmware version, transmit updated firmware to the storage device based on the storage device completing an input/output operation corresponding to an input/output request waiting to be processed within a specified time, and reset the storage device to allow the memory controller to execute the updated firmware based on completion of installation of the updated firmware in the storage device.

According to an embodiment, the processor may be configured to stop providing the input/output request to the storage device based on the identified version of the firmware corresponding to a version that needs to be updated.

According to an embodiment, the processor may be configured to resume providing the input/output request to the storage device based on the input/output operation corresponding to the waiting input/output request not being completed within the specified time.

According to an embodiment, the storage device may include a buffer (e.g., the buffer 415 of FIG. 4), and the processor may be configured to store the updated firmware in the buffer.

According to an embodiment, the processor may be configured to reset the storage device while the electronic device is continuously powered.

According to an embodiment, the processor may be configured to reset the storage device without restarting (or rebooting) the electronic device.

According to an embodiment, the processor may be configured to wait for the specified time in a state that the processor does not enter an inactive state.

According to an embodiment, the processor may be configured to determine whether the firmware of the memory controller is successfully updated based on resetting of the storage device.

According to an embodiment, the processor may be configured to resume providing the input/output request to the storage device based on determining that the firmware is successfully updated.

According to an embodiment, the memory may include a NAND flash memory.

Figure 5:
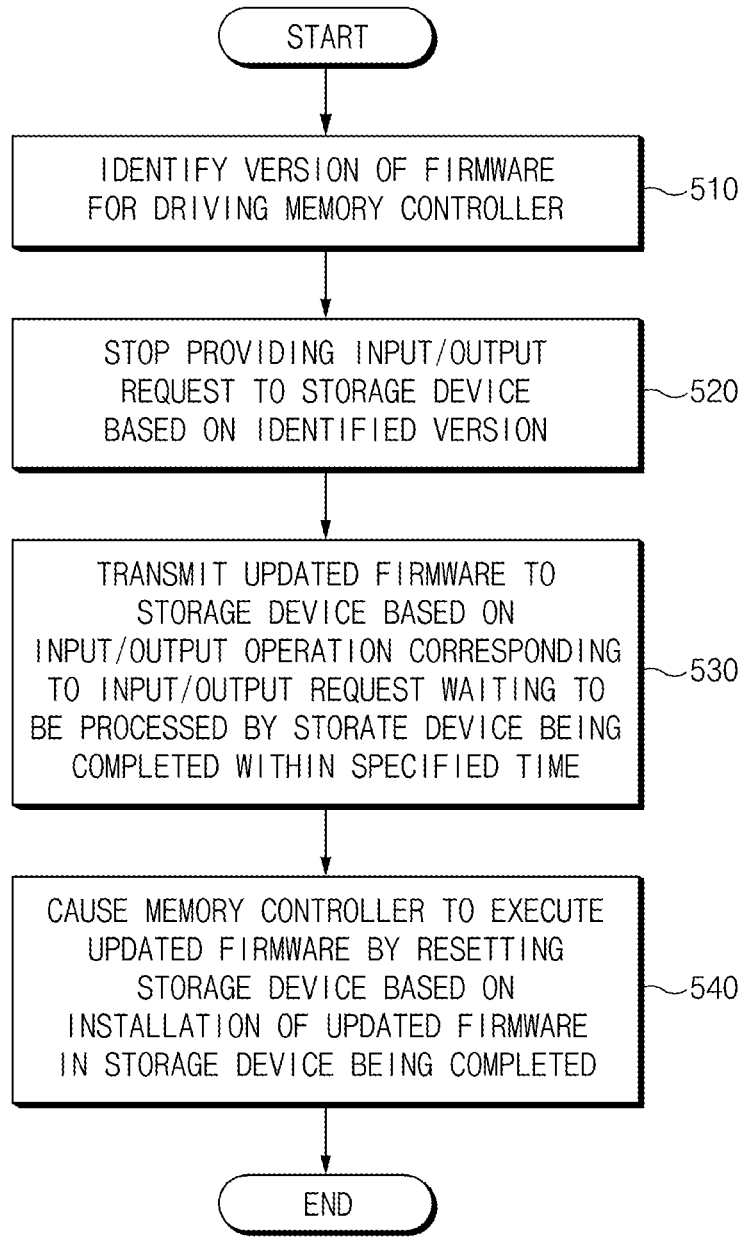
FIG. 5 is a flowchart illustrating an example method of operating an electronic device according to various embodiments.

FIG. 5 is a flowchart illustrating an example method of operating an electronic device according to various embodiments.

According to an embodiment, in operation 510, a processor (e.g., the processor 120 of FIG. 1, the processor 320 of FIG. 3, or the processor 420 of FIG. 4) of an electronic device (e.g., the electronic device 101 of FIG. 1, the electronic device 301 of FIG. 3, or the electronic device 401 of FIG. 4) including a storage device (e.g., the memory 130 of FIG. 1, the storage device 310 of FIG. 3, or the storage device 410 of FIG. 4) may identify the version of the firmware for driving a memory controller (e.g., the memory controller 413 of FIG. 4) for controlling a memory (e.g., the memory 411 of FIG. 4) included in the storage device. For example, the storage device may be a UFS device. For example, the memory may include a non-volatile memory. For example, the memory may include a NAND flash memory. In an embodiment, the processor may determine whether the firmware of the memory controller needs to be updated. For example, when the identified version of the firmware of the memory controller is the latest version, the processor may recognize that the firmware update is not required. In another example, when the checked version of the firmware of the memory controller is not the latest version, the processor may recognize that the firmware needs to be updated.

According to an embodiment, in operation 520, the processor may stop providing the input/output request to the storage device based on the identified version of firmware. In an embodiment, the processor may set a state (e.g., host busy status) not to provide an additional input/output request to the storage device based on the first notification indicating that the checked firmware version is not the latest version. For example, the first notification may include information indicating that the identified firmware needs to be updated. According to an embodiment, the processor may wait for a specified time (e.g., 5 seconds) for the storage device to complete an input/output request (e.g., a pending input/output request) waiting to be processed. According to an embodiment, the processor may set the state of the electronic device not to enter an inactive state (e.g., a suspend state) for a specified waiting time.

According to an embodiment, in operation 530, the processor may transmit the updated firmware to the storage device based on the storage device completing an input/output operation corresponding to an input/output request waiting to be processed within a specified time. According to an embodiment, the processor may transmit the updated firmware to the storage device based on the second notification. For example, the second notification may include information indicating that the storage device has completed an operation corresponding to the pending input/output request within a specified time. According to an embodiment, after receiving the second notification, the processor may store the updated firmware in a buffer (e.g., the buffer 415 of FIG. 4) of the storage device. According to an embodiment, the memory controller may update the firmware by installing (or using) the updated firmware.

According to an embodiment, in operation 540, the processor may reset the storage device based on the installation of the updated firmware in the storage device being completed, thereby causing the memory controller to execute the updated firmware. According to an embodiment, the storage device may install the updated firmware. According to an embodiment, the processor may reset the storage device based on the third notification. For example, the third notification may include information indicating that installation of updated firmware in the memory controller is completed. According to an embodiment, the processor may reset the storage device to execute updated firmware. According to an embodiment, after the storage device is reset, the memory controller may be driven by executing updated firmware. According to an embodiment, the processor may reset the storage device to activate the updated firmware of the memory controller without restarting the electronic device. According to an embodiment, the processor may reset the storage device while power is continuously supplied to the electronic device to complete the update of firmware of the memory controller. According to an embodiment, the processor may recognize that the firmware of the memory controller has been successfully updated, using information included in a return value obtained based on a specified instruction. According to an embodiment, based on the successful firmware update, the processor may release a state set not to provide an additional input/output request. For example, the processor may transmit an additional input/output request to the storage device.

Figure 6:
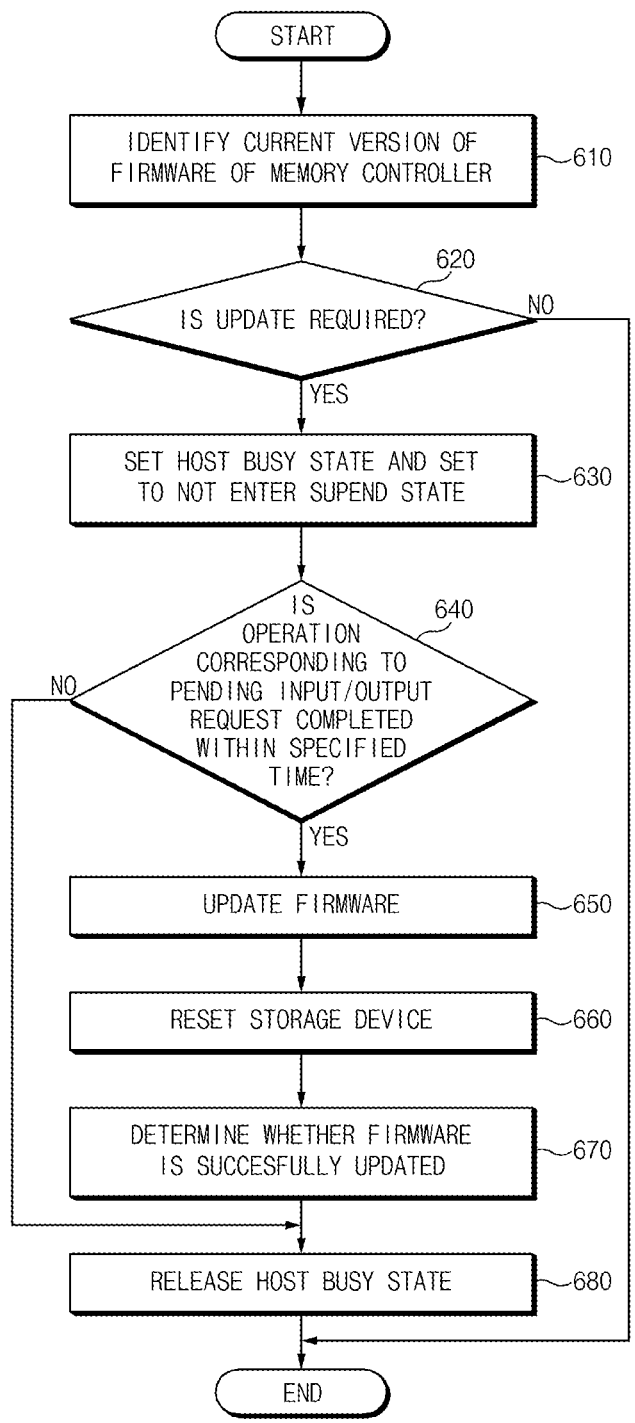
FIG. 6 is a flowchart illustrating an example method of operating an electronic device according to various embodiments.

FIG. 6 is a flowchart illustrating an example method of operating an electronic device according to various embodiments.

According to an embodiment, in operation 610, an update module (e.g., the update module 421 of FIG. 4) of an electronic device (e.g., the electronic device 101 of FIG. 1, the electronic device 301 of FIG. 3, or the electronic device 401 of FIG. 4) may identify the current version of firmware for driving a memory controller (e.g., the memory controller 413 of FIG. 4) included in a storage device (e.g., the memory 130 of FIG. 1, the storage device 310 of FIG. 3, or the storage device 410 of FIG. 4). For example, the storage device including the memory controller may be a UFS device. For example, the memory controller may control a nonvolatile memory (e.g., a NAND flash memory).

According to an embodiment, in operation 620, the update module may identify whether the firmware needs to be updated. For example, when the current version of the firmware is the latest version (NO), the update module may identify that the firmware does not need to be updated and may thus end the updating operations. In another example, when the current version of the firmware is not the latest version (YES), the update module may identify that the firmware needs to be updated. When the firmware needs to be updated, operation 630 may be performed.

According to an embodiment, in operation 630, the host driver (e.g., the host driver 423 of FIG. 4) may be set in a host busy status to prevent an additional input/output request from being provided to a storage device (e.g., the memory 130 of FIG. 1, the storage device 310 of FIG. 3, or the storage device 410 of FIG. 4). In an embodiment, the host driver may wait for a specified time for the storage device to complete an operation corresponding to a pending input/output request (e.g., an input/output request waiting to be processed). In an embodiment, the host driver may be set to not enter the suspend state for a specified waiting time.

According to an embodiment, in operation 640, the host driver may identify whether an operation corresponding to the pending input/output request is completed within a specified time. In an embodiment, when an operation corresponding to the pending input/output request is completed within a specified time, operation 650 may be performed. In another example, when the operation corresponding to the pending input/output request is not completed within the specified time, operation 680 may be performed.

According to an embodiment, in operation 650, the host driver may update the firmware of the memory controller. In an embodiment, the host driver may provide the updated firmware to a buffer (e.g., the buffer 415 of FIG. 4) of the storage device. The memory controller may update the firmware using the updated firmware. For example, the memory controller may install the updated firmware.

According to an embodiment, in operation 660, the host driver may reset the storage device. According to an embodiment, when the storage device is reset, the updated firmware may be activated. The memory controller of the reset storage device may be driven using the updated firmware. According to an embodiment, the host driver may reset the storage device to activate the updated firmware for driving the memory controller without restarting (or rebooting) the electronic device. According to an embodiment, the host driver may reset the storage device while power is continuously supplied to the electronic device, thereby activating the updated firmware of the memory controller.

According to an embodiment, in operation 670, the host driver may determine whether the firmware of the memory controller is successfully updated, using a specified instruction (e.g., bdeviceFFUStatus).

According to an embodiment, in operation 680, the host driver may release the set host busy status based on the fact that the firmware is successfully updated. According to an embodiment, after the host busy status is released, the host driver may be in a state (e.g., a normal state) capable of providing an input/output request to the storage device. For example, a host driver may resume providing an input/output request to a storage device that is interrupted. In another example, when an operation corresponding to the pending input/output request is not completed within a specified time, the host driver may release the host busy status.

A method of operating an electronic device (e.g., the electronic device 101 of FIG. 1, the electronic device 301 of FIG. 3, or the electronic device 401 of FIG. 4) according to an example embodiment of the disclosure may include: identifying a version of firmware for driving a memory controller (e.g., the memory controller 413 of FIG. 4) of a storage device (e.g., the memory 130 of FIG. 1, the storage device 310 of FIG. 3, or the storage device 410 of FIG. 4) included in the electronic device, stopping providing an input/output request to the storage device based on the identified firmware version, transmitting updated firmware to the storage device based on the storage device completing an input/output operation corresponding to an input/output request waiting to be processed within a specified time, and resetting the storage device to allow the memory controller to execute the updated firmware based on completion of installation of the updated firmware in the storage device.

According to an embodiment, the stopping of the provision of the input/output requests may include stopping providing the input/output request to the storage device based on the identified version of the firmware corresponding to a version that needs to be updated.

According to an embodiment, the method may further include resuming providing the input/output request to the storage device based on the input/output operation corresponding to the waiting input/output request not being completed within the specified time.

According to an embodiment, the storage device may include a buffer (e.g., the buffer 415 of FIG. 4), and the transmitting of the updated firmware may include storing the updated firmware in the buffer.

According to an embodiment, the executing of the updated firmware may include resetting the storage device while the electronic device is continuously powered.

According to an embodiment, the executing of the updated firmware may include resetting the storage device without restarting (or rebooting) the electronic device.

According to an embodiment, the transmitting of the updated firmware may include waiting for the specified time in a state in which the electronic device does not enter an inactive state, and transmitting the updated firmware to the storage device based on a notification indicating that the storage device completes the input/output operation corresponding to the input/output request waiting for processing within the specified time.

According to an embodiment, the method may further include determining whether the firmware of the memory controller is successfully updated.

According to an embodiment, the method may further include resuming providing the input/output request to the storage device based on determining that the firmware is successfully updated.

According to an embodiment, the storage device may include a NAND flash memory.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device comprising:
   a storage device including a memory and a memory controller configured to control the memory; and
   a processor operatively coupled to the storage device,
   wherein the processor is configured to:
   identify a version of firmware for driving the memory controller, while the processor is set in a first status for providing an input/output request to the storage device,
   when the version of firmware identified requires updating, set a status of the processor from the first status to a second status for stopping providing an additional input/output request to the storage device in addition to the input/output request,
   while the processor is set in the second status:
   in response to determining that the storage device has not completed an input/output operation corresponding to the input/output request that is provided by the processor in the first status, within a specified time, set the status of the processor from the second status to the first status so that the processor resumes providing the additional input/output request to the storage device,
   in response to determining that the storage device has completed the input/output operation corresponding to the input/output request that is provided by the processor in the first status, within the specified time, transmit updated firmware to the storage device so that the storage device installs the updated firmware, activate the updated firmware by resetting the storage device instead of restarting and/or rebooting the electronic device, based on completion of installation of the updated firmware in the storage device, and set the status of the processor from the second status to the first status based on activation of the updated firmware, wherein the restarting and/or rebooting of the electronic device includes a series of operations of supplying power to the electronic device after turning off supplying power to the electronic device, and wherein the resetting the storage device includes continuously supplying the power to the electronic device without turning off supplying power to the electronic device.

2. The electronic device of claim 1, wherein the storage device includes a buffer, and wherein the processor is configured to:

store the updated firmware in the buffer.

3. The electronic device of claim 1, wherein the processor is configured to:

wait for the specified time in a state that the processor does not enter an inactive state.

4. The electronic device of claim 1, wherein the processor is configured to:

determine whether the firmware of the memory controller is successfully updated based on resetting the storage device.

5. The electronic device of claim 4, wherein the processor is configured to:

resume providing the additional input/output request to the storage device based on determining that the firmware is successfully updated.

6. The electronic device of claim 1, wherein the memory includes a NAND flash memory.

7. A method of operating an electronic device, the method comprising:

identifying a version of firmware for driving a memory controller of a storage device included in the electronic device, while a processor of the electronic device is set in a first status for providing an input/output request to the storage device;

when the version of firmware identified requires updating, setting a status of the processor from the first status to a second status for stopping providing an additional input/output request to the storage device in addition to the input/output request;

while the processor is set in the second status:

in response to determining that the storage device has not completed an input/output operation corresponding to the input/output request that is provided by the processor in the first status, within a specified time, setting the status of the processor from the second status to the first status so that the processor resumes providing the additional input/output request to the storage device;

in response to determining that the storage device has completed the input/output operation corresponding to the input/output request that is provided by the processor in the first status, within the specified time, transmitting updated firmware to the storage device so that the storage device installs the updated firmware;

activating the updated firmware by resetting the storage device instead of restarting and/or rebooting the electronic device, based on completion of installation of the updated firmware in the storage device; and setting the status of the processor from the second status to the first status based on activation of the updated firmware, wherein the restarting and/or rebooting of the electronic device includes a series of operations of supplying power to the electronic device after turning off supplying power to the electronic device, and wherein the resetting the storage device includes operation of continuously supplying the power to the electronic device without turning off supplying power to the electronic device.

8. The method of claim 7, wherein the storage device includes a buffer, wherein the transmitting of the updated firmware includes:

storing the updated firmware in the buffer.

9. The method of claim 7, wherein the transmitting of the updated firmware includes:

waiting for the specified time in a state that the electronic device does not enter an inactive state; and transmitting the updated firmware to the storage device based on a notification indicating that the storage device completes the input/output operation corresponding to the input/output request waiting for processing within the specified time.

10. The method of claim 7, further comprising:

determining whether the firmware of the memory controller is successfully updated.

11. The method of claim 10, further comprising:

resuming providing the input/output request to the storage device based on determining that the firmware is successfully updated.

12. The method of claim 7, wherein the storage device includes a NAND flash memory.

* * * * *